US011144343B1

(12) United States Patent
Kim et al.

(10) Patent No.: US 11,144,343 B1
(45) Date of Patent: Oct. 12, 2021

(54) METHOD OF PROVIDING SESSION CONTAINER MOUNTED WITH PLURALITY OF LIBRARIES REQUESTED BY USER

(71) Applicant: Lablup Inc., Seoul (KR)

(72) Inventors: Joon Gi Kim, Seoul (KR); Jeong Kyu Shin, Seoul (KR); Jong Hyun Park, Seoul (KR)

(73) Assignee: Lablup Inc., Seoul (KR)

( * ) Notice: Subject to any disclaimer, the term of this patent is extended or adjusted under 35 U.S.C. 154(b) by 0 days.

(21) Appl. No.: 17/284,533

(22) PCT Filed: Jun. 4, 2019

(86) PCT No.: PCT/KR2019/006730
§ 371 (c)(1),
(2) Date: Apr. 12, 2021

(87) PCT Pub. No.: WO2020/222352
PCT Pub. Date: Nov. 5, 2020

(30) Foreign Application Priority Data

Apr. 29, 2019 (KR) ........................ 10-2019-0049711

(51) Int. Cl.
*G06F 9/455* (2018.01)
*G06F 9/46* (2006.01)
*G06F 9/48* (2006.01)
*G06F 9/50* (2006.01)

(52) U.S. Cl.
CPC .............. *G06F 9/461* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 2009/45562;
(Continued)

(56) References Cited

U.S. PATENT DOCUMENTS 9,891,939 B2 * 2/2018 Hunt .................. G06F 9/45558
2017/0228227 A1 8/2017 Winterfeldt et al.
(Continued)

FOREIGN PATENT DOCUMENTS

| | | | |
|---|---|---|---|
| KR | 10-2017-0022028 A | 3/2017 |
| KR | 10-2017-0072552 A | 6/2017 |
| KR | 10-1747518 B1 | 6/2017 |
| KR | 10-2017-0122568 A | 11/2017 |

OTHER PUBLICATIONS

International Search Report dated Jan. 28, 2020 in corresponding International application No. PCT/KR2019/006730; 4 pages.
(Continued)

*Primary Examiner* — Charles M Swift
(74) *Attorney, Agent, or Firm* — Maier & Maier, PLLC

(57) ABSTRACT

A method for providing a session container mounted with a plurality of libraries requested by a user. The method includes: in response to receiving a container execution request from the user, searching for a library container in a container catalog by a node controller; checking, by the node controller, whether a session container to be mounted with a library in the library container and the library container are compatible; and when the session container to be mounted with the library in the library container and the library container are compatible, generating, by a container engine, a session container mounted with the library in the library container.

3 Claims, 3 Drawing Sheets

Start
Request container execution by user — S401
Search for library in library catalog by node controller based on user's request — S403
Check, by node controller, whether session container and library are compatible — S405
Generate, by container engine, session container mounted with library — S407
Execute generated session container by node controller — S409
End

(52) U.S. Cl.
CPC ............ *G06F 9/45558* (2013.01); *G06F 9/48* (2013.01); *G06F 9/485* (2013.01); *G06F 9/4843* (2013.01); *G06F 9/50* (2013.01); *G06F 9/5005* (2013.01); *G06F 9/5027* (2013.01); *G06F 9/5061* (2013.01); *G06F 9/5077* (2013.01); *G06F 2009/4557* (2013.01); *G06F 2009/45583* (2013.01)

(58) Field of Classification Search
CPC ... G06F 2009/4557; G06F 2009/45583; G06F 9/461; G06F 9/48; G06F 9/4843; G06F 9/485; G06F 9/50; G06F 9/5005; G06F 9/5027; G06F 9/5061; G06F 9/5077
See application file for complete search history.

(56) References Cited

U.S. PATENT DOCUMENTS

| | | | | |
|---|---|---|---|---|
| 2017/0269978 | A1* | 9/2017 | Engel | G06F 9/541 |
| 2018/0046446 | A1* | 2/2018 | Turovsky | G06F 8/71 |
| 2018/0096002 | A1* | 4/2018 | Nagaraja | G06F 16/13 |
| 2018/0196741 | A1* | 7/2018 | Qureshi | G06F 8/60 |
| 2020/0314167 | A1* | 10/2020 | Achyuth | G06F 9/45545 |

OTHER PUBLICATIONS

Notice of Allowance dated Mar. 24, 2020 in corresponding Korean application No. 10-2019-0049711; 4 pages.
Notification of Reason for Refusal dated Nov. 21, 2019 in corresponding Korean application No. 10-2019-0049711; 6 pages.

* cited by examiner

METHOD OF PROVIDING SESSION CONTAINER MOUNTED WITH PLURALITY OF LIBRARIES REQUESTED BY USER

FIELD

The present disclosure relates to a method of providing a session container mounted with a plurality of libraries requested by a user, and more specifically, to a method of mounting and executing a plurality of libraries, requested by a user, in a session container in runtime.

RELATED ART

Container is emerging as a virtualization technology that overcomes the drawbacks of virtual machines by using the operating-system-level isolation technology, not virtualization. The container kernel-level execution environment is implemented in a way that the host's operating system kernel is shared, while the user-level execution environment is implemented in a way that uses a fully isolated file system and virtualized name spaces of resource elements provided by the kernel. The content of the isolated file system is composed of an application and all dependencies, libraries, and other binaries and configuration files required to run the application in one package. The kernel resource elements divided by the virtualized namespaces and provided to the container include a process ID, a network socket, a user account, a shared memory for inter-process communication (IPC), and the like. Other hardware access is handled in the same way as in the case of non-container, and thus, it is possible to fully utilize the performance of host hardware without overhead. Here, the operating system provides an option to limit the maximum amount of available hardware resources per container.

Meanwhile, the conventional container image is a bundle of all libraries required to program execution and guarantees convenience of distribution. However, if individual libraries are separately updated or additional libraries are needed, it is difficult to reflect the update or need in real time in a runtime, and there is an inconvenience of having to rebuild an image from scratch.

SUMMARY

An aspect of the present disclosure provides a method of mounting and executing a number of libraries desired by a user in a session container in real time at runtime using library containers including the libraries and a container catalog describing information on the libraries.

According to an embodiment of the present disclosure, there is provided a method for providing a session container mounted with a plurality of library containers requested by a user, the method including: in response to receiving a container execution request from the user, searching for a library container in a container catalog by a node controller; checking, by the node controller, whether a session container to be mounted with a library in the library container and the library container are compatible; and when the session container to be mounted with the library in the library container and the library container are compatible, generating, by a container engine, a session container mounted with the library in the library container.

The method may further include executing the session container by the node controller, and executable files of the library container may be generated in a statically building manner so that the executable files are executed in the session container.

Directories and files provided by the container catalog may be mounted in the session container in a bind mount form. The method may further include additionally designating a required library from the container catalog according to the user's request.

According to the present disclosure, it is possible to provide a session container, in which libraries desired by a user are combined and loaded, using a library container in a container catalog.

Also, since an executable file provided by the library container is statically built, the executable file can be executed in any container environment.

DETAILED DESCRIPTION

Any structural or functional description specified for embodiments in accordance with the concept of the present disclosure disclosed in the present specification is simply provided for description of the embodiments in accordance with the concept of the present disclosure, and it shall be appreciated that the embodiments in accordance with the concept of the present disclosure may be embodied in various forms and may not be limited to the embodiments described herein.

Since there can be a variety of permutations and embodiments of the present disclosure, certain embodiments will be illustrated and described with reference to the accompanying drawings. This, however, is by no means to restrict the present disclosure to certain embodiments, and shall be construed as including all permutations, equivalents and substitutes covered by the ideas and scope of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hereinafter, embodiments of the present disclosure will be described in detail with reference to the accompanying drawings.

Figure 1:
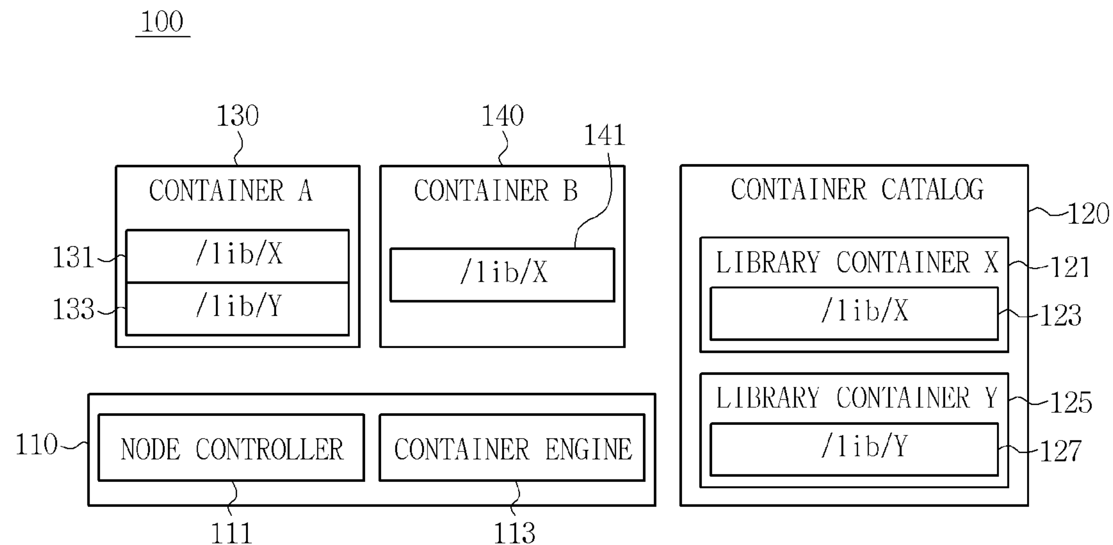
FIG. 1 is a diagram illustrating the software structure of a system for providing a session container mounted with a plurality of libraries requested by a user according to an embodiment of the present disclosure.

FIG. 1 is a diagram illustrating the software structure of a system for providing a session container mounted with a plurality of libraries requested by a user according to an embodiment of the present disclosure.

Referring to FIG. 1, the software structure of a system 100 for providing a session container includes an operating system 110, a container catalog 120, and session containers 130 and 140.

The operating system 110 is composed of a node controller 111 and a container engine 113. The operating system 110 communicates with a processor through a processor driver installed in an operating system kernel.

When receiving the session container execution from the user, the node controller 111 searches for a library container based on information requested from the user in the container catalog 120. In addition, when the node controller 111 receives a request to add a library from a user, the node controller 111 may additionally designate a required library in the container catalog.

The node controller 111 may check whether the session containers 130 and 140 to be mounted with respective library containers and the library containers 121 and 125 are compatible. In this case, it is possible to check the compatibility according to CPU structures and distribution types between the session containers and the library container, but aspects of the present disclosure are not limited thereto. In other words, only when a session container and a library container are compatible, it is possible to generate the session container mounted with the library container. The node controller 111 may additionally designate and mount a required library from the container catalog in runtime.

When the session containers and the library containers are compatible, the container engine 113 may generate and distribute the session containers 130 and 140, and may execute application programs respectively corresponding to the session containers 130 and 140. That is, the container engine 113 may execute and terminate a generated session container. In this case, directories and files provided by the container catalog may be mounted in the session container in a volume-mount form.

The container catalog 120 may store a plurality of library containers 121 and 125. The container catalog 120 may be configured in an operating system as a kind of database, and may be disposed in a separate server according to embodiments.

The first library container 121 includes a first library 123, and the second library container 125 includes a second library 127.

The first session container 130 may be mounted with a first library 131 identical to the first library 123 in the first library container 121, and a second library 133 identical to the second library 127 of the second library container 125, and the second session container 140 may be mounted only with a first library 141 identical to the first library 123 in the first library container 121. That is, it is possible to generate a session container mounted with a specific library according to a user's request. In addition, it is possible to additionally designate and mount a required library from the container catalog in runtime.

The session containers 130 and 140 are each a container for executing software requested by a user, the container which is a space containing images that bundle various programs, source codes, libraries etc. necessary to drive a user program. The user program is actually driven by the operating system 110. That is, the operating system 110 may access each of the session containers 130 and 140 through the container engine 113 to execute and process a corresponding user program. Although the first session container 130 mounted with the first library 131 and the second library 133, and the second session container 140 mounted with the first library 141 are illustrated according to the user's request, this does not limit the number of session containers and the number of libraries to mount. In the present disclosure, an executable file provided by the library container is statically built, so the executable file can be executed in any arbitrary container environment, and a session container combining libraries desired by the user through the library container in the container catalog may be provided in real time.

Figure 2:
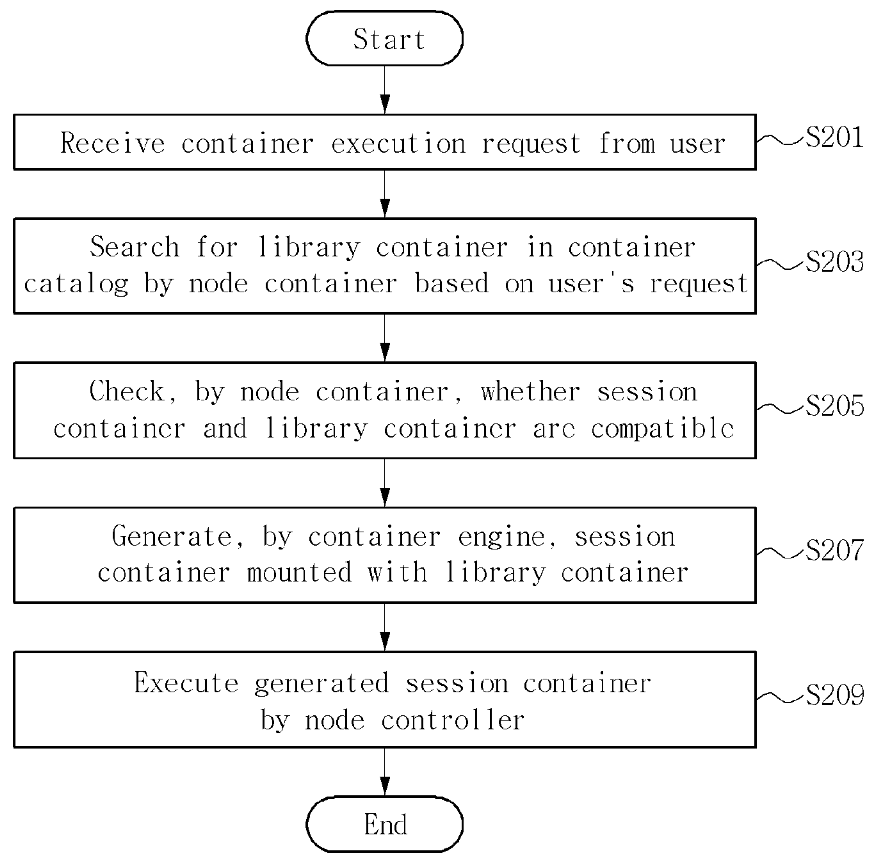
FIG. 2 is a flowchart illustrating a method of providing a session container mounted with a plurality of libraries requested by a user according to an embodiment of the present disclosure.

FIG. 2 is a flowchart illustrating a method of providing a session container mounted with a plurality of libraries requested by a user according to an embodiment of the present disclosure.

Referring to FIG. 2, when a user requests container execution and a container execution request is received from the user in operation S201, the node controller 111 searches for a library container in the container catalog 120 in operation S203. In this case, when the user requests to add a library, an operation of additionally designating a required library from the container catalog may be further included.

Thereafter, the node controller 111 checks whether a session container to be mounted with the library container 120 and the library containers 121 and 125 are compatible in operation S205.

When the session container to be mounted with the library container 120 and the library containers 121 and 125 are compatible, the container engine 113 generates a session container 140 mounted with a library in the library container in operation S207. In this case, directories and files provided by the container catalog may be mounted in the session container in a volume mount form. When the session container to be mounted with the library container 120 and the library containers 121 and 125 are not compatible, the process is terminated.

Thereafter, the node controller 111 executes the generated session containers 130 and 140 in operation S209.

Figure 3:
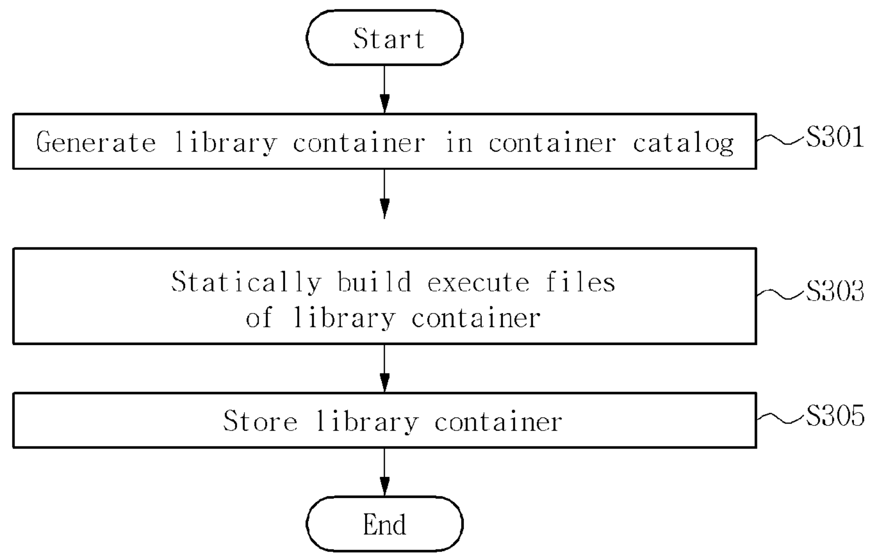
FIG. 3 is a flowchart illustrating a method of generating a library container according to an embodiment of the present disclosure.

FIG. 3 is a flowchart illustrating a method of generating a library container according to an embodiment of the present disclosure.

Referring to FIG. 3, a container catalog generates a library container including a library in operation S301. At this time, library executable files of the library container may be generated in a statically building manner. That is, the executable files of the library container are generated in a statically building manner so that the executable files can be executed in the session container in operation S303. The generated library container is stored in the container catalog in operation S305.

Figure 4:
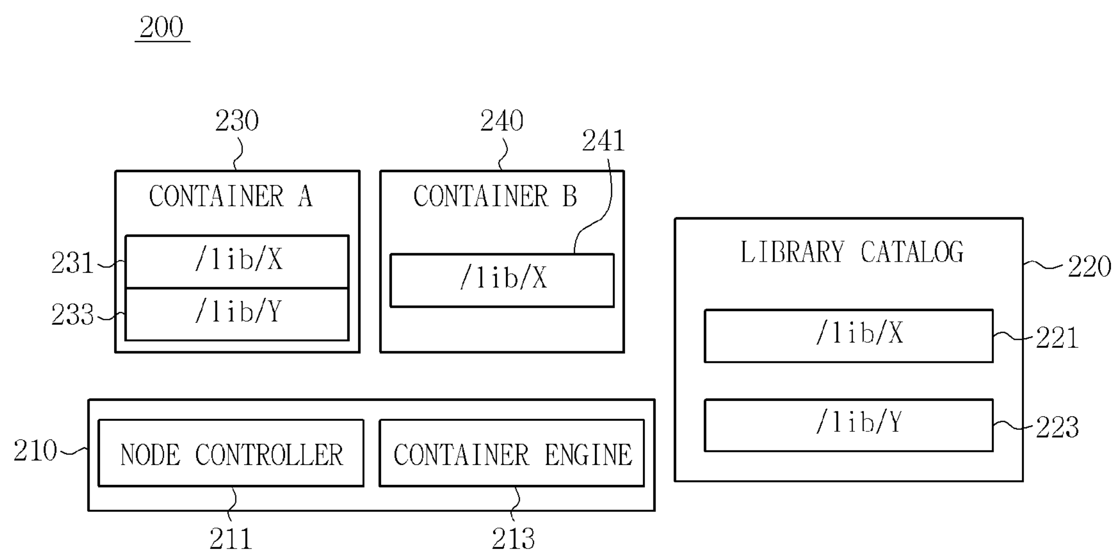
FIG. 4 is a diagram illustrating the software structure of a system for providing a session container mounted with a plurality of libraries requested by a user according to another embodiment of the present disclosure.

FIG. 4 is a diagram for explaining a software structure of a system for providing a session container mounted with a plurality of libraries requested by a user according to another embodiment of the present disclosure.

Referring to FIG. 4, the software structure of a system 200 for providing a session container includes an operating system 210, a library catalog 220, and session containers 230 and 240.

The operating system 210 is composed of a node controller 211 and a container engine 213. The operating system 210 communicates with a processor through a processor driver installed in an operating system kernel.

When receiving a session container execution request from the user, the node controller 211 searches for a library in the library catalog 220 based on information requested from the user. In addition, when a request to add a library is received from a user, the node controller 211 may additionally designate a required library in the library catalog.

The node controller 211 may check whether the session containers 230 and 240 to be mounted with libraries and the libraries 221 and 223 are compatible. In this case, it is possible to check the compatibility according to CPU structures and distribution types between the session containers and the libraries, but aspects of the present disclosure are not limited thereto. In other words, it is possible to generate a session container mounted with a library of the library catalog only when the session container and the library are compatible. The node controller 211 may additionally designate and mount a required library from the container catalog in runtime.

When the session containers 230 and 240 to be mounted with libraries and the libraries 221 and 223 are compatible, the container engine 213 may generate and distribute the session containers 230 and 240, and each of the session containers 230 and 240 may execute a corresponding application program. That is, the container engine 213 may execute and terminate a generated session container. In this case, directories and files provided by the library catalog may be mounted in the session container in a bind-mount form.

The library catalog 220 may store a plurality of libraries 221 and 223. The library catalog 220 may be configured in an operating system as a kind of database, and may be disposed in a separate server according to embodiments.

The first session container 230 may be mounted with a first library 231 identical to the first library 221 and a second library 233 identical to the second library 223, and the second session container 240 may be mounted only with a first library 241 identical to the first library 221. That is, it is possible to generate a session container mounted with a specific library according to a user's request. In addition, it is possible to additionally designate and mount a required library from the library catalog in runtime.

The session containers 230 and 240 are each a container for executing software requested by a user, the container which is a space containing images that bundle various programs, source codes, libraries, etc. necessary to run a user program. The user program is actually driven by the operating system 210. That is, the operating system 210 may access each of the session containers 230 and 240 through the container engine 213 to execute and process a corresponding user program. Although the first session container 230 mounted with the first library 231 and the second library 233 and the session container 240 mounted with the first library 241 are illustrated according to the user's request, this does not limit the number of session containers and the number of libraries to mount. In the present disclosure, since an executable file provided by a library is statically built, the executable file may be executed in any arbitrary container environment, and a session container that combines libraries in a library catalog may be provided.

Figure 5:
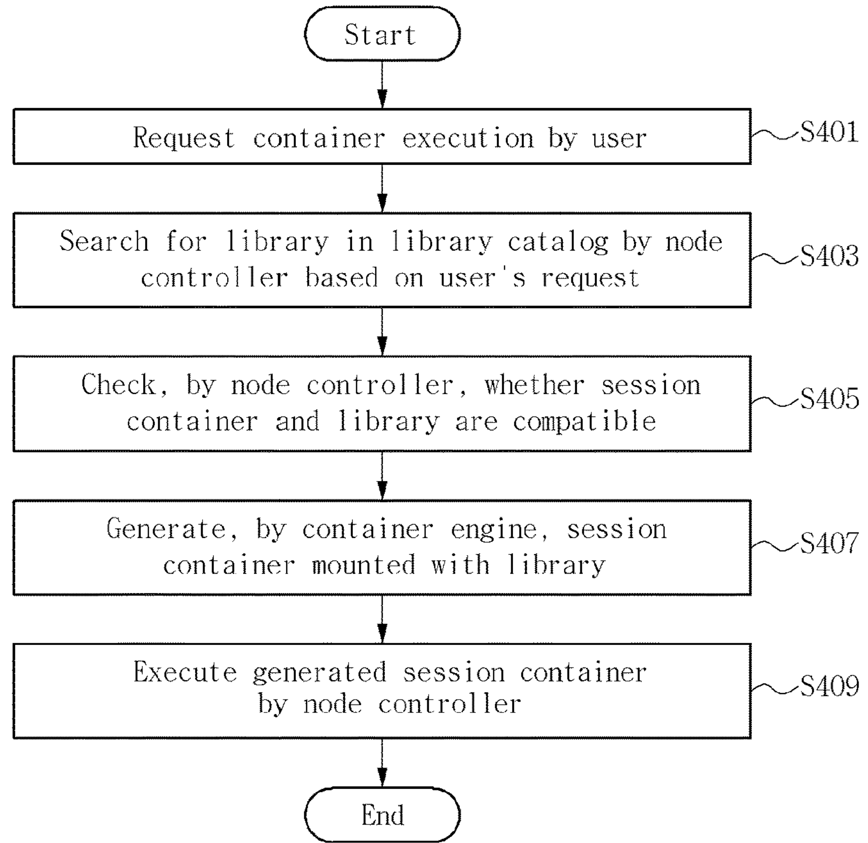
FIG. 5 is a flowchart illustrating a method of providing a session container mounted with a plurality of libraries requested by a user according to another embodiment of the present disclosure.

FIG. 5 is a flowchart illustrating a method of providing a session container mounted with a plurality of libraries requested by a user according to another embodiment of the present disclosure.

Referring to FIG. 5, when a user requests container execution and the container execution request is received from the user in operation S401, a node controller searches for a library in a library catalog in operation S403. In this case, when the user requests to add a library, an operation of additionally designating a required library from the library catalog may be further included.

Thereafter, the node controller checks whether the session container to be mounted with the library and the library are compatible in operation S405.

When the session container to be mounted with the library and the library are compatible, the container engine generates the session container mounted with the library in the library container in operation S407. In this case, directories and files provided by the library catalog may be mounted in the session container in a bind mount form. When the session container to be mounted with the library and the library are not compatible, the process is terminated.

Thereafter, the node controller executes the generated session container in operation S409.

Figure 6:
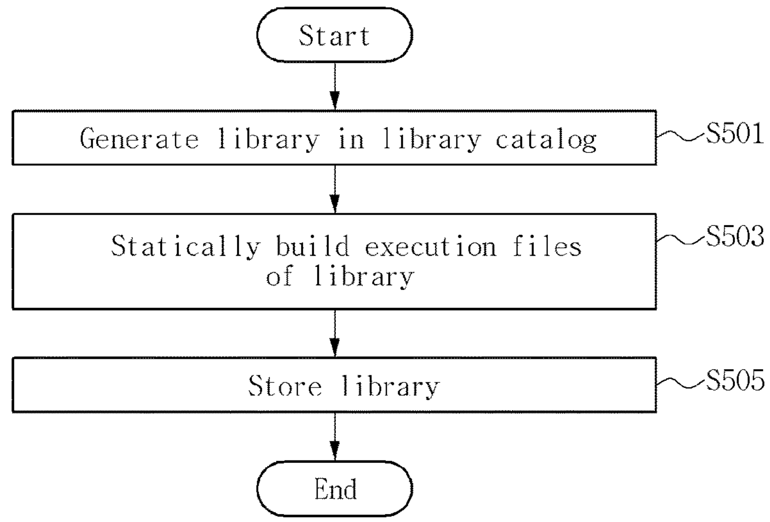
FIG. 6 is a flowchart illustrating a method of generating a library container according to another embodiment of the present disclosure.

FIG. 6 is a flowchart illustrating a method of generating a library container according to another embodiment of the present disclosure.

Referring to FIG. 6, a library catalog generates a library in operation S501. In this case, executable files of the library may be generated in a statically building manner. That is, the executable files of the library may be generated in a statically building manner so that the executable files can be executed in the session container in operation S503. The generated library is stored in the library catalog in operation S505.

While the present disclosure has been described with reference to the certain exemplary embodiment which is shown in the drawings, it will be understood by a person having ordinary skill in the art that various changes in forms and details and various modified embodiments may be made therefrom. Therefore, the true scope of the present disclosure shall be defined by the technical principle of the appended claims.

What is claimed is:

1. A method for providing a session container mounted with a plurality of libraries requested by a user, the method comprising:

in response to receiving a container execution request from the user, searching for a library container in a container catalog by a node controller;

checking, by the node controller, whether a session container to be mounted with a library in the library container and the library container are compatible;

when the session container to be mounted with the library in the library container and the library container are compatible, generating, by a container engine, a session container mounted with the library in the library container;

executing the generated session container by the node controller;

checking, by the node controller, a compatibility between the session containers and the library container according to CPU structures and distribution types; and designating, by the node controller, a required library from a container catalog according to the user's request.

2. The method of claim 1, wherein the library in the library container is generated in statically building manner so that the library is executed in the session container.

3. The method of claim 1, wherein the library in the library container is mounted in the session container in a volume mount form.

* * * * *